(12) United States Patent
Kurihara

(10) Patent No.: US 9,669,566 B2
(45) Date of Patent: Jun. 6, 2017

(54) LIGHT IRRADIATION MOLDING APPARATUS AND LIGHT IRRADIATION MOLDING METHOD

(71) Applicant: JSR Corporation, Minato-ku (JP)

(72) Inventor: Fumio Kurihara, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 14/669,036

(22) Filed: Mar. 26, 2015

(65) Prior Publication Data
US 2015/0197041 A1    Jul. 16, 2015

Related U.S. Application Data

(62) Division of application No. 13/698,837, filed as application No. PCT/JP2011/059691 on Apr. 20, 2011.

(30) Foreign Application Priority Data

May 17, 2010   (JP) ................................ 2010 112996

(51) Int. Cl.
| | |
|---|---|
| B29C 45/56 | (2006.01) |
| B29C 45/52 | (2006.01) |
| B29C 35/08 | (2006.01) |
| B29C 33/40 | (2006.01) |
| B29C 37/00 | (2006.01) |

(Continued)

(52) U.S. Cl.
CPC .............. *B29C 35/08* (2013.01); *B29C 33/06* (2013.01); *B29C 33/40* (2013.01); *B29C 33/405* (2013.01);

(Continued)

(58) Field of Classification Search
CPC ...... B29C 2043/525; B29C 2043/3605; B29C 37/005; B29C 43/56; B29C 43/561;

(Continued)

(56) References Cited

U.S. PATENT DOCUMENTS

| | | | |
|---|---|---|---|
| 5,370,521 A * | 12/1994 | McDougall | ......... B29C 43/3607 264/102 |
| 6,280,678 B1 * | 8/2001 | Hara | ....................... B29C 70/78 264/266 |

(Continued)

FOREIGN PATENT DOCUMENTS

| | | |
|---|---|---|
| JP | 2007 216444 | 8/2007 |
| JP | 2007 216447 | 8/2007 |

(Continued)

OTHER PUBLICATIONS

Alumilite, How to's: Tape Mold—Making the Mold, Aug. 27, 2008.*

*Primary Examiner* — Jeffrey Wollschlager
*Assistant Examiner* — Armand Melendez
(74) *Attorney, Agent, or Firm* — Oblon, McClelland, Maier & Neustadt, L.L.P.

(57) ABSTRACT

A light irradiation molding apparatus 1 includes a pair of rubber die units 2A and 2B, which are formed of a rubber material having a property of transmitting light X therethrough and form a cavity between facing sides which face each other, and a light irradiation means 4, which applies light X to a particulate or solid thermoplastic resin 6 arranged in the cavity 20 through surfaces of a pair of the rubber die units 2A and 2B. The light irradiation molding apparatus 1 is constituted so that a pair of the rubber die units 2A and 2B are made to come close to each other while the thermoplastic resin 6 arranged in the cavity 20 is molten by the light X applied from the light irradiation means 4, and a molded article 7 of the thermoplastic resin 6 is formed in the cavity 20 having a reduced volume.

9 Claims, 10 Drawing Sheets

(51) Int. Cl.
*B29C 43/02* (2006.01)
*B29C 43/36* (2006.01)
*B29C 33/06* (2006.01)
*B29C 43/52* (2006.01)
*B29K 101/12* (2006.01)
*B29L 31/00* (2006.01)

(52) U.S. Cl.
CPC ........ *B29C 35/0888* (2013.01); *B29C 37/005* (2013.01); *B29C 43/02* (2013.01); *B29C 43/36* (2013.01); *B29C 45/561* (2013.01); *B29C 43/52* (2013.01); *B29C 2035/0822* (2013.01); *B29K 2101/12* (2013.01); *B29L 2031/00* (2013.01)

(58) Field of Classification Search
CPC .......... B29C 39/42; B29C 2045/14155; B29C 2045/1745; B29C 2049/627; B29C 2791/006; B29C 51/82; B29C 51/85
See application file for complete search history.

(56) References Cited

U.S. PATENT DOCUMENTS

| | | | |
|---|---|---|---|
| 6,627,124 B1 * | 9/2003 | Herbrechtsmeier | B29C 35/0888 264/1.1 |
| 8,202,459 B2 | 6/2012 | Kurihara et al. | |
| 2004/0245677 A1 * | 12/2004 | Marple | B29C 33/36 264/496 |
| 2007/0090554 A1 * | 4/2007 | Wykoff | B29C 43/36 264/102 |
| 2008/0036107 A1 * | 2/2008 | Yeung | B29C 33/3835 264/40.1 |
| 2009/0224433 A1 * | 9/2009 | Kurihara | B29C 33/06 264/402 |
| 2011/0114902 A1 * | 5/2011 | Kurihara | B29B 13/022 252/587 |
| 2012/0220746 A1 | 8/2012 | Kurihara et al. | |
| 2014/0061978 A1 * | 3/2014 | Kurihara | B29C 35/0888 264/496 |
| 2014/0225314 A1 | 8/2014 | Kurihara | |
| 2015/0174795 A1 * | 6/2015 | Kurihara | B29C 35/0888 264/322 |

FOREIGN PATENT DOCUMENTS

| | | | |
|---|---|---|---|
| JP | 2008 12896 | | 1/2008 |
| JP | WO 2009123046 | * | 8/2009 |
| JP | 2009 241455 | | 10/2009 |
| JP | 2010 269541 | | 12/2010 |
| WO | 2009 123046 | | 10/2009 |
| WO | 2011 070998 | | 6/2011 |

* cited by examiner

LIGHT IRRADIATION MOLDING APPARATUS AND LIGHT IRRADIATION MOLDING METHOD

CROSS-REFERENCE TO RELATED PATENT APPLICATIONS

This application is a divisional application of and claims the benefit of priority under 35 U.S.C. §120 from U.S. application Ser. No. 13/698,837, filed Nov. 19, 2012, the entire contents of each of which are incorporated herein by reference. U.S. application Ser. No. 13/698,837 is based upon and claims the benefit of priority from PCT/JP11/059691, filed Apr. 20, 2011 and from Japanese Patent Application No. 2010-112996, filed on May 17, 2010.

TECHNICAL FIELD

The present invention relates to a light irradiation molding apparatus for forming a molded article by filling a thermoplastic resin in a cavity formed by a pair of rubber die units having a property of transmitting light therethrough, and irradiating the resin with light; and a light irradiation molding method.

BACKGROUND ART

As a method for obtaining a molded article having a predetermined shape, using a thermoplastic resin, there are generally various molding methods including injection molding, blow molding, extrusion molding, press-molding, and the like.

Besides these general molding methods, for example, Patent Document 1 discloses a method in which a thermoplastic resin is irradiated with an electromagnetic wave having a wavelength range of 0.78 to 2 μm through molding dies when the molten thermoplastic resin is filled in a cavity in a molding die. According to the method, the thermoplastic resin is heated more strongly than the molding die formed of rubber, due to the differences in physical properties between the rubber forming the molding die and the thermoplastic resin.

In addition, for example, Patent Document 2 discloses that a particulate thermoplastic resin in a cavity in a rubber molding die is irradiated with an electromagnetic wave having a wavelength range of 0.78 to 2 μm to heat and melt this thermoplastic resin, and then a molten thermoplastic resin is additionally filled in a space left in the cavity.

PRIOR ART DOCUMENTS

Patent Documents

Patent Document 1: JP-A-2007-216447
Patent Document 2: JP-A-2009-241455

SUMMARY OF THE INVENTION

Problems to be Solved by the Invention

According to Patent Document 1, however, an apparatus for previously melting pellets of thermoplastic resin in the state of a particle or a solid is necessary, because the thermoplastic resin which has been previously molten is filled in the cavity in the molding die. According to the Patent Document 2, the same apparatus as above is necessary, too, because the molten thermoplastic resin is additionally filled. In addition, when the thermoplastic resin is filled in a molten state, it is necessary to secure the extra thermoplastic resin, and thus it is difficult to reduce the amount of the thermoplastic resin used.

The present invention has been made in view of the conventional problems described above, and it provides a light irradiation molding apparatus and a light irradiation molding method, which does not require the apparatus which previously melts a thermoplastic resin and introduces it into a cavity, and is capable of forming a molded article using a small amount of the thermoplastic resin.

Means for Solving the Problem

A first aspect of the present invention is a light irradiation molding apparatus including a pair of rubber die units which are formed of a rubber material having a property of transmitting light therethrough and form a cavity between facing sides which face each other, and a light irradiation means for applying light to a particulate or solid thermoplastic resin arranged in the cavity through surfaces of a pair of the rubber die units, which is characterized in that a pair of the rubber die units are constituted so that they are made to come close to each other to reduce a volume of the cavity while the thermoplastic resin arranged in the cavity is molten by the light emitted from the light irradiation means.

A second aspect is a light irradiation molding method characterized by using a pair of rubber die units which are formed of a rubber material having a property of transmitting light therethrough and form a cavity between facing sides which face each other, and a light irradiation means for applying light to a particulate or solid thermoplastic resin arranged in the cavity through surfaces of a pair of the rubber die units; making a pair of the rubber die units to come close to each other to reduce a volume of the cavity, while the thermoplastic resin arranged in the cavity is molten by applying light emitted from the light irradiation means; and forming a molded article of the thermoplastic resin in the cavity having a reduced volume.

Effect of the Invention

According to the light irradiation molding apparatus and the light irradiation molding method described above, a cavity having a larger volume than that of a molded article to be formed is formed between a pair of rubber die units, and the molded article is obtained while the volume of the cavity is reduced, when a particulate or solid thermoplastic resin is molten.

The particulate or solid thermoplastic resin is arranged in the cavity between a pair of the rubber die units, and light is applied to the surfaces of a pair of the rubber die units by using the light irradiation means. At this time, much light penetrates the rubber die units and is absorbed in the thermoplastic resin. The thermoplastic resin is heated and molten by this mechanism. At this time, a pair of the rubber die units are made to come close to each other, thereby reducing the volume of the cavity, and as a result, the molten thermoplastic resin fills up the whole of the cavity.

As described above, a molded article of the thermoplastic resin can be formed in the cavity having the reduced volume. The molded article can be taken out by releasing a pair of the rubber die units after the article is cooled and solidified.

According to the light irradiation molding apparatus and the light irradiation molding method described above, therefore, an apparatus for previously melting the thermoplastic resin and pouring it into the cavity is not required, and the molded article can be formed of a small amount of the thermoplastic resin.

When the solid thermoplastic resin is used, it is possible that the solid thermoplastic resin is arranged in a part of the cavity and a particulate thermoplastic resin is arranged in a remaining part of the cavity.

MODE FOR CARRYING OUT THE INVENTION

Figure 1:
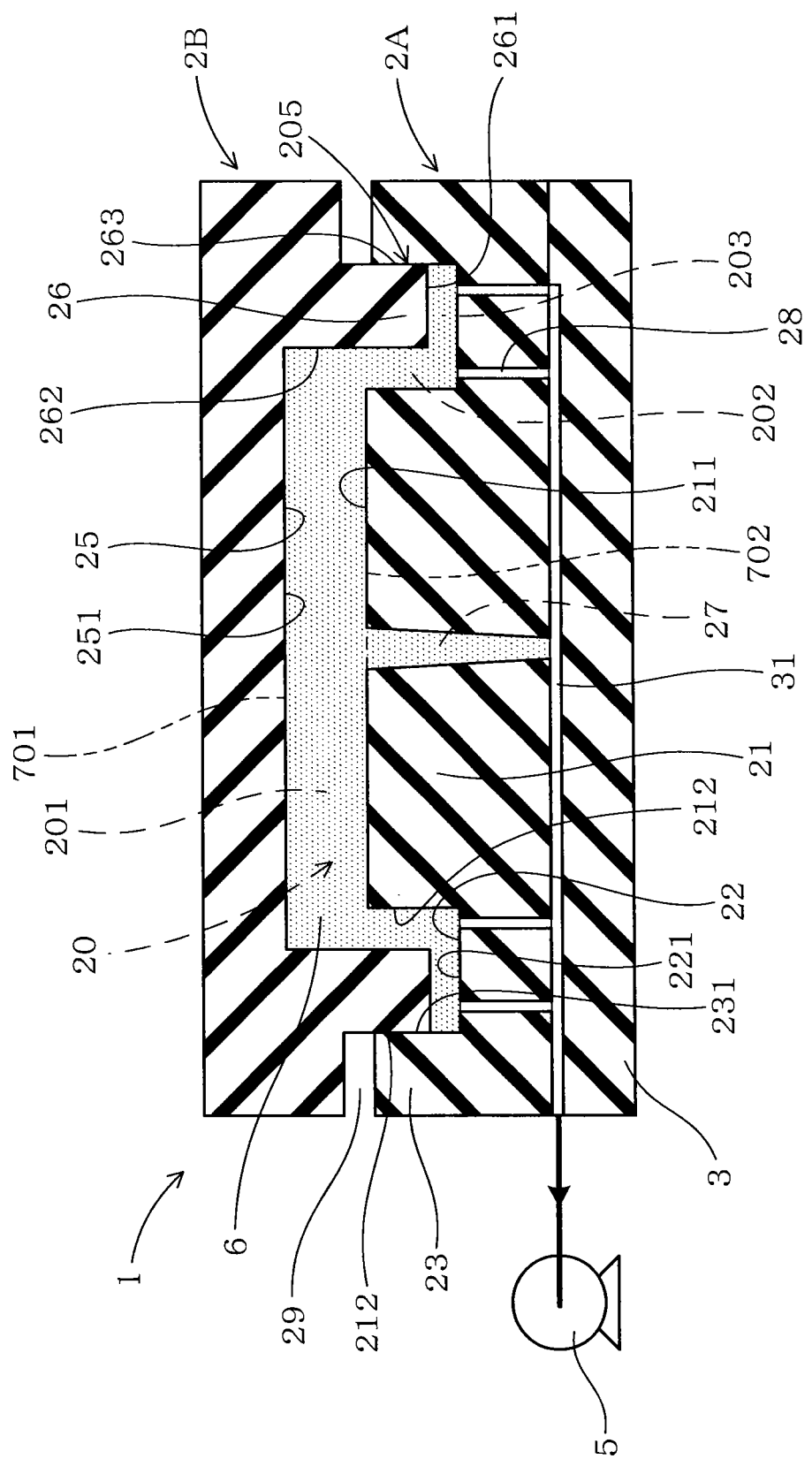
FIG. 1 An illustrative drawing showing a state in which a thermoplastic resin is arranged in a cavity between a pair of rubber die units which are located in an initial position in Example 1, as a front cross-sectional view.

Preferable embodiments of the light irradiation molding apparatus and the light irradiation molding method described above will be explained.

The thermoplastic resin is used in the state of a particle or a solid. Here, "particle" means a spherical shape, a cylindrical shape, and an indeterminate shape in a crushed product. "Solid" refers to a plate, a bar or a linear state.

The particulate or solid thermoplastic resin can be appropriately selected depending on a shape of a desired molded article. The particulate or solid thermoplastic resin may be used as a mixture of two or more resins having a different shape.

When the thermoplastic resin is in the state of a particle, the particle size of the thermoplastic resin which can be used depends on a thickness of a molded article, i.e., a width of a cavity, and the particle size of the thermoplastic resin can be within a range of 1 to 3000 µm. The particle size of the thermoplastic resin can be preferably within a range of 50 to 3000 µm, more preferably within a range of 200 to 2500 µm.

When the thermoplastic resin has an average particle size within the range described above and includes small particles of the thermoplastic resin having a particle size of 1 to 100 µm, such thermoplastic resin is sometimes preferable to be filled into the cavity. The particles have a bulk density of preferably 0.4 or more, more preferably 0.45 or more, further more preferably 0.5 or more.

The light irradiation means preferably generates light including a wavelength range of 0.78 to 2 µm. In this case, a larger amount of light can be easily absorbed in the thermoplastic resin in the cavity than in the rubber die units, and the thermoplastic resin can be more positively heated and molten than the rubber die units.

The lights (electromagnetic waves), which are applied to the thermoplastic resin through the rubber die units, may have not only light having a wavelength with a range of 0.78 to 2 µm but also light having a wavelength with a range other than the above. In this case, the lights, which are applied to the thermoplastic resin through the rubber die units, preferably include a larger amount of light having a wavelength with a range of 0.78 to 2 µm than light having a wavelength with a range other than the above.

As the thermoplastic resin used for forming the molded article (hereinafter may be referred to as only a "thermoplastic resin"), resins capable of absorbing lights (electromagnetic waves) thereby promoting heating can be used.

This thermoplastic resin is not particularly limited so long as it has thermoplasticity, and includes rubber-reinforced styrene resins such as an ABS resin (acrylonitrile butadiene styrene resin), an ASA resin (acrylate styrene acrylonitrile resins) and an AES resin (acrylonitrile ethylene-propylene-diene styrene resin); styrene resins such as polystyrene, a styrene-acrylonitrile copolymer, a styrene-maleic anhydride copolymer, and a (meth)acrylic ester-styrene copolymer; olefin resins such as polyethylene and polypropylene; cyclic olefin resins, acrylic resins, polycarbonate resins, polyester resins, polyamide resins, vinyl chloride resins, polyacrylate resins, polyacetal resins, polyphenylene ether resins, polyphenylene sulfide resins, fluorine-containing resins, imide resins, ketone resins, sulfone resins, urethane resins, polyvinyl acetate, polyethylene oxide, polyvinyl alcohol, polyvinyl ether, polyvinyl butylal, phenoxyl resins, photosensitive resins, liquid crystal polymers, biodegradable plastics, and the like. These may be used alone or as a mixture of two or more kinds thereof.

Of the thermoplastic resins described above, the thermoplastic resins which are preferably used for light irradiation molding include the rubber-reinforced styrene resins, the olefin resins, the acrylic resins, the polyester resins, the polyamide resins, alloy of the polyester resin and the polycarbonate resin, alloy of the rubber-reinforced styrene resin and the polycarbonate resin, alloy of the rubber-reinforced styrene resin and the polyester resin, and the like.

Further, the thermoplastic resin is preferably an amorphous thermoplastic resin.

As a pair of the rubber die units are formed of rubber, the cooling speed of the thermoplastic resin is slower than that obtained in a case in which a metal molding die is used. The crystallinity of the thermoplastic resin, accordingly, may be increased while the resin is cooled, whereby the accuracy of dimension or the impact resistance of the molded article may be reduced. On the contrary, when the amorphous thermoplastic resin is used as the thermoplastic resin, the reduction of the accuracy of dimension or the impact resistance of the molded article may be prevented.

The thermoplastic resin may further include additives such as fibrous, particulate or sheet filler, a decorating agent such as a metallic pigment, an ultraviolet absorbing agent, an antioxidant, an age inhibitor, an anti-static agent, a flame retardant, a weatherproofing agent, a plasticizer, a lubricant, an antibacterial agent, an agent for providing hydrophilic property and a pale color coloring agent, depending on the objective or the use.

A pair of the rubber die units are preferably formed of transparent or translucent silicone rubber.

In this case, not only the rubber die units can be easily produced but also the thermoplastic resin can be selectively heated by using light having a wavelength range of 0.78 to 2 μm while the rubber die units are hardly heated.

The silicone rubber has preferably a hardness of 25 to 80, measured in accordance with JIS-A Standard.

The light irradiation molding apparatus includes a vacuum means for vacuating a cavity, and is preferably constituted so that a pressure inside the cavity is made lower than a pressure outside a pair of the rubber die units by the vacuum means to generate a suction force on a pair of the rubber die units, whereby a pair of the rubber die units are made to come close to each other when the thermoplastic resin is molten.

In addition, in the light irradiation molding method, it is preferable that a pressure inside the cavity is made lower than a pressure outside a pair of the rubber die units by the vacuum means for vacuating a cavity to generate a suction force on a pair of the rubber die units, whereby a pair of the rubber die units are made to come close to each other when the thermoplastic resin is molten.

In these cases, a pair of the rubber die units are easily made to come close to each other by the suction force (die clamping force) generated by the vacuum means. In addition, when a pair of the rubber die units are made to come close to each other by utilizing the suction force, the molten thermoplastic resin can be easily spread through the whole of the cavity.

A pair of the rubber die units can be forcibly made to come close to each other by applying an external force to a pair of the rubber die units, in addition of utilization of the suction force generated by the vacuum means.

A pair of the rubber die units may be constituted so that an engaging protrusion, which is formed in one unit, is engaged with a depression to be engaged, which is formed in the other unit, in an initial position before the units are made to come close to each other, and a whole circumference of a parting plane, which is formed between a pair of the rubber die units, is closed by the engaging protrusion and the depression to be engaged.

In this case, it is easy to prevent leakage of the thermoplastic resin from a gap formed on the parting plane for an approach of a pair of rubber die units to each other.

In addition, a pair of the rubber die units may be constituted so that a cavity-forming protrusion formed in one of the rubber die units is arranged in a cavity-forming depression formed in the other rubber die unit in an initial position before the rubber die units are made to come close to each other, and the parting plane is entirely closed by a resin tape which is pasted on an entire circumference of the parting plane formed between a pair of the rubber die units.

In this case, it can also be easy to prevent leakage of the thermoplastic resin from a gap formed on the parting plane for an approach of a pair of the rubber die units to each other.

It is preferable that one of a pair of the rubber die units has a cavity-forming protrusion which forms a reverse face of the molded article, an annular engagement depression which is formed on an entire circumference of a fringe area of the cavity-forming protrusion, and an annular outer circumference protrusion which is projected from an entire circumference of a fringe area of the annular engagement depression; and the other rubber die unit has a cavity-forming depression which has the cavity-forming protrusion arranged therein to form a designed face of the molded article, and an annular inner circumference protrusion which is projected from an entire circumference of a fringe area of the cavity-forming depression and is engaged with an inner circumferential surface of the annular outer circumference protrusion and is arranged in the annular engagement depression, wherein the cavity is continuously formed between an apical surface of the cavity-forming protrusion and a bottom face of the cavity-forming depression, between an outer circumferential surface of the cavity-forming protrusion and an inner circumferential surface of the annular inner circumference protrusion, and between a bottom face of the annular engagement depression and an apical surface of the annular inner circumference protrusion, in an initial position before a pair of the rubber die units are made to come close to each other; a suction port which opens in the apical surface of the cavity-forming protrusion, and suction gates which open in the bottom face of the annular engagement depression, are formed in the one of a pair of the rubber die units; and the suction port and the suction gates are communicated with a vacuum suction pathway for vacuating by means of the vacuum means.

In this case, the engagement of the inner circumferential surface of the annular outer circumference protrusion in one of a pair of the rubber die units with the outer circumferential surface of the annular inner circumference protrusion in the other of a pair of the rubber die units can easily prevent leakage of the thermoplastic resin from the gap in the parting plane formed for approach of a pair of the rubber die units to each other.

When the vacuum suction in the cavity is performed through the suction port and the suction gates, a suction force can be easily generated between a pair of the rubber die units, and the molten thermoplastic resin can be easily spread through the whole of the cavity.

In addition, when the particulate thermoplastic resin arranged in the cavity is molten, the excess molten thermoplastic resin, which overflows from the cavity, can be introduced into the suction port.

It is preferable that the suction port also serves as an input port for throwing the particulate thermoplastic resin into the cavity.

In this case, when the thermoplastic resin is arranged in the cavity, the particulate thermoplastic resin can be thrown through the suction port in a condition in which a pair of the rubber die units are closed.

It is preferable to constitute a pair of the rubber die units so that a pair of the rubber die units are made to come close to each other until the bottom face of the annular engagement depression in one of a pair of the rubber die units comes into contact with the apical surface of the annular inner circumference protrusion in the other of a pair of the rubber die units, and the thermoplastic resin is supplied from the surplus space formed between the bottom face of the annular engagement depression and the apical surface of the annular inner circumference protrusion to the stand-up wall space formed between the outer circumferential surface of the cavity-forming protrusion and the inner circumferential surface of the annular inner circumference protrusion so as to form the molded article.

In this case, the accuracy of dimension of the molded article to be formed can be stabilized. In addition, an excess amount of the thermoplastic resin used for molding can be decreased as much as possible, and thus the amount of the thermoplastic resin used can be decreased.

The suction gate has preferably a smaller fluid passage cross-sectional area than that of the suction port. The suction gates are preferably formed in an open state at positions facing the bottom face of the cavity-forming depression and positions facing the annular inner circumference protrusion on the bottom face of the annular engagement depression.

In this case, it is difficult to cause clogging of the suction gate with the particulate thermoplastic resin, and the thermoplastic resin can be stably spread to edges of the cavity.

The opening positions of the suction gate in the bottom face of the annular engagement depression are preferably arranged at least at a pair or multiple pairs of positions facing each other through a central part in the annular shape. This can make the suction from the suction port well-balanced in a circumferential direction.

The light irradiation molding apparatus can be constituted so that the light irradiation means applies light on the outside surface of the other of a pair of the rubber die units, the suction gates is prevented from closing by melting and filling the particulate thermoplastic resin arranged in the cavity on the cavity-forming depression side first so that the vacuum suction by the vacuum means is continued until the thermoplastic resin is filled in the whole cavity.

According to the light irradiation molding method, it is possible that the light emitted from the light irradiation means is applied to the outside surface of the other of a pair of the rubber die units, the suction gates is prevented from closing by melting and filling first the particulate thermoplastic resin arranged in the cavity from the cavity-forming depression side first so that the vacuum suction by the vacuum means is continued until the thermoplastic resin is filled in the whole cavity.

In these cases, the closure of the suction gates can be effectively prevented, and the suction force can be applied to between a pair of the rubber die units until the thermoplastic resin is filled in the whole cavity.

The light irradiation molding apparatus can be constituted so that the light irradiation means apply the light, moving partially, sequentially and relatively from one side of the outside surface of the other of a pair of the rubber die units to the other side, and the thermoplastic resin is sequentially filled in the cavity from one side thereof to the other side.

According to the light irradiation molding method, it is possible that the light from the light irradiation means is applied, moving partially and sequentially from one side of the outside surface of the other of a pair of the rubber die units to the other side, and the thermoplastic resin is sequentially filled in the cavity from one side thereof to the other side.

In these cases, the thermoplastic resin can be stably spread through the whole of the cavity by gradual melting of the thermoplastic resin in the cavity.

EXAMPLE

Referring to drawings, Examples of the light irradiation molding apparatus and method of the present invention will be explained below.

Example 1

Figure 2:
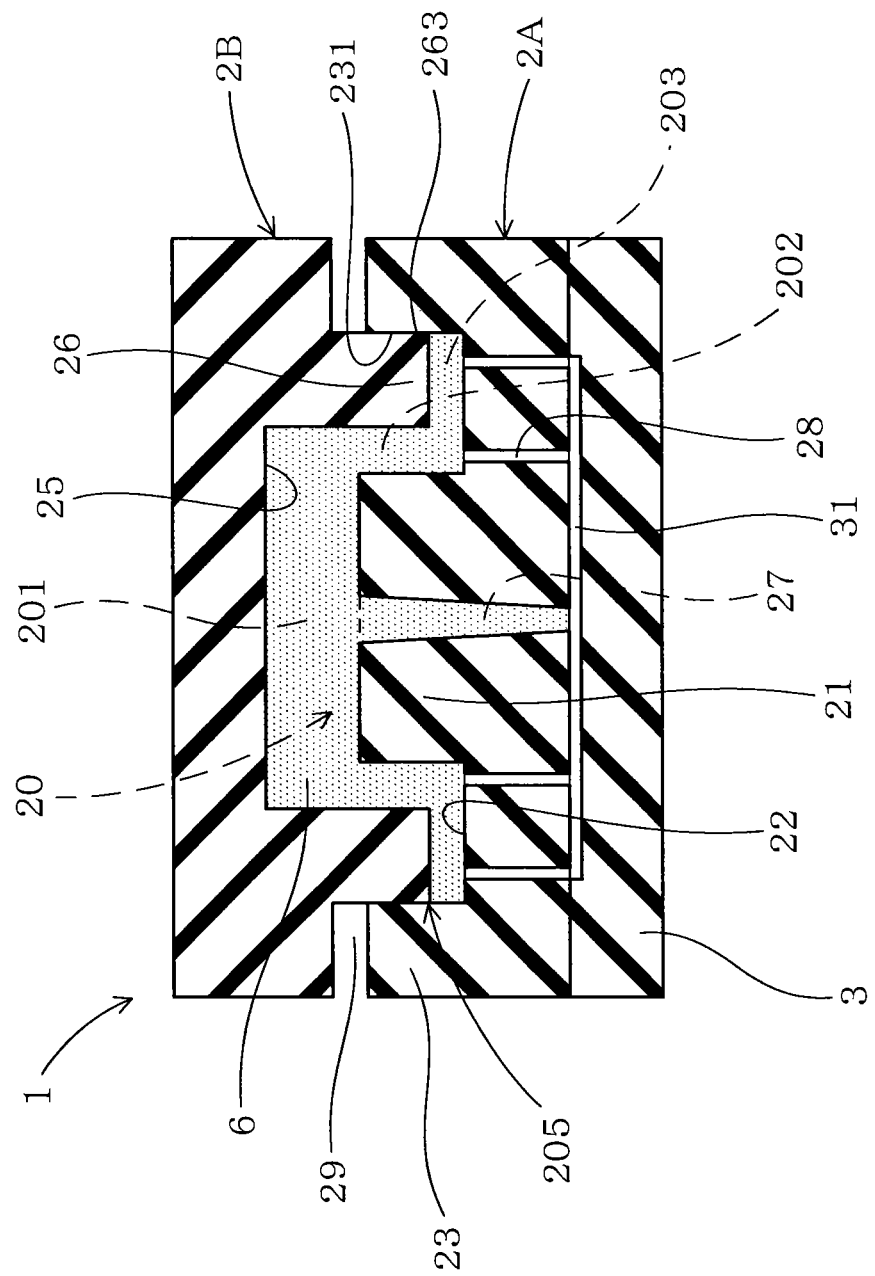
FIG. 2 An illustrative drawing showing a state in which a thermoplastic resin is arranged in a cavity between a pair of rubber die units which are located in an initial position in Example 1, as a lateral cross-sectional view.
Figure 4:
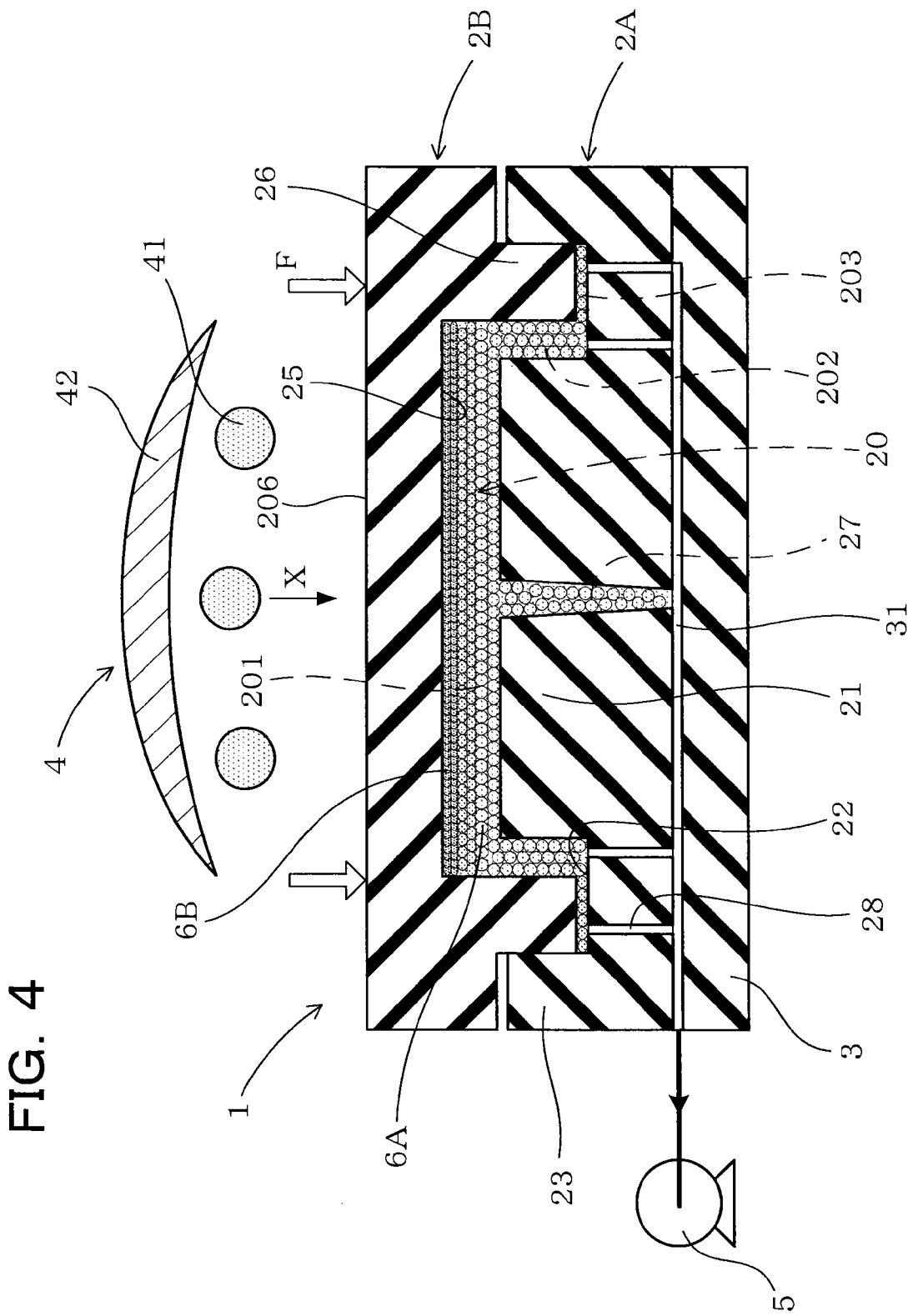
FIG. 4 An illustrative drawing showing a state in which a thermoplastic resin receives light irradiation and is molten, and a pair of the rubber die units are made to come close slightly to each other in Example 1, as a front cross-sectional view.
Figure 5:
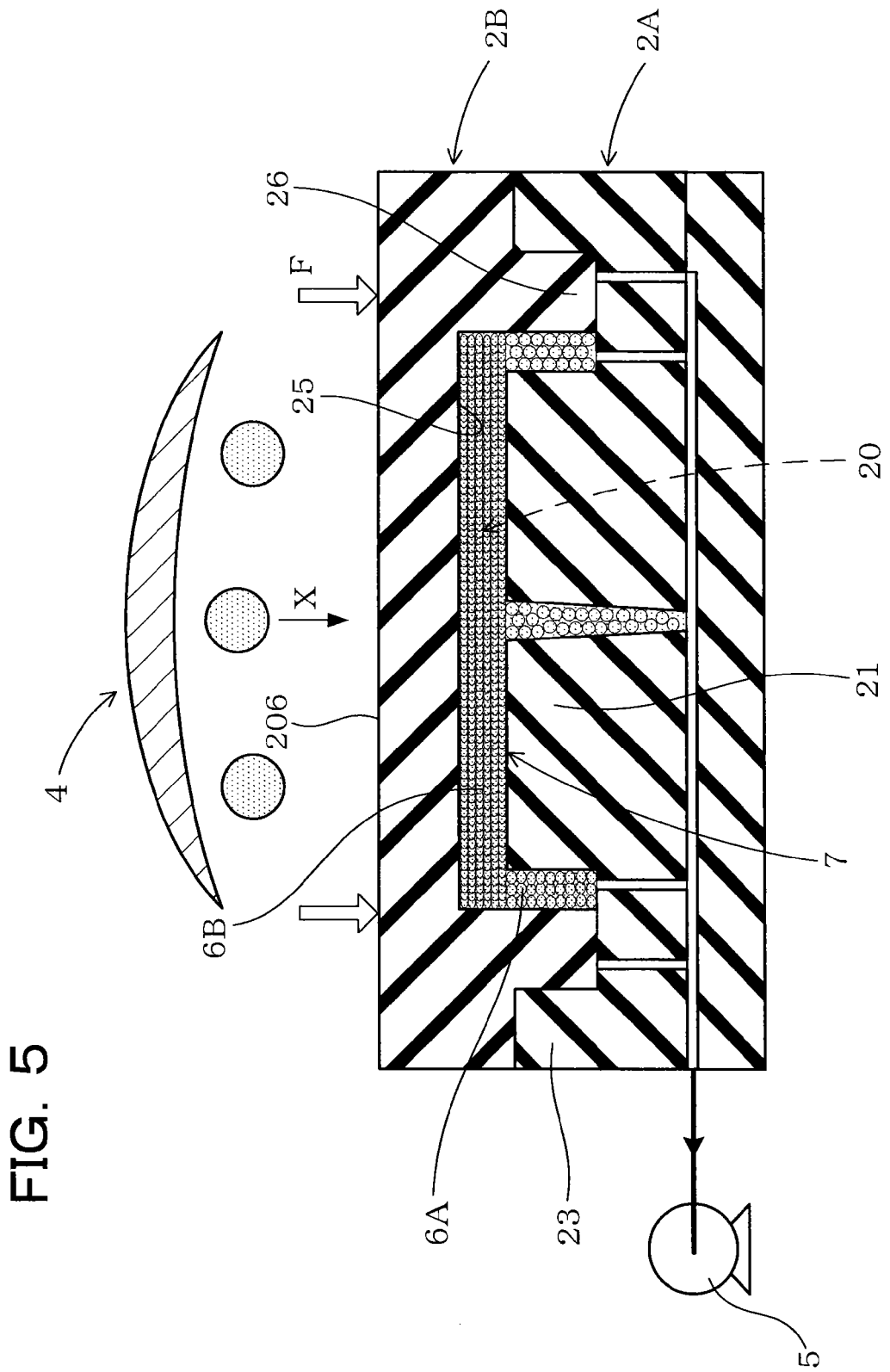
FIG. 5 An illustrative drawing showing a state in which a thermoplastic resin receives light irradiation and is molten, and a pair of the rubber die units are made to come closest to each other in Example 1, as a front cross-sectional view.

A light irradiation molding apparatus 1 of this Example includes, as shown in FIG. 1, FIG. 2 and FIG. 4, a pair of rubber die units 2A and 2B, which are formed of a rubber material having a property of transmitting light X therethrough and form a cavity 20 in a facing position to each other when the units are put together, and a light irradiation means 4 for applying light X to particulate thermoplastic resin 6 arranged in the cavity 20 through surfaces of a pair of the rubber die units 2A and 2B. The light irradiation molding apparatus 1 has, as shown in FIG. 4 and FIG. 5, a structure in which a pair of the rubber die units 2A and 2B are made to come close to each other to reduce the volume of the cavity 20 while the thermoplastic resin 6 arranged in the cavity 20 is molten by light X emitted from the light irradiation means 4, and a molded article 7 of the thermoplastic resin 6 is formed in the cavity 20 having the reduced volume.

FIG. 1 and FIG. 2 show a state in which a pair of the rubber die units 2A and 2B are arranged in an initial position P1. FIG. 4 shows a state in which a pair of the rubber die units 2A and 2B are slightly made to come close to each other. FIG. 5 shows a state in which the molded article 7 is formed at a position P2 at which a pair of the rubber die units 2A and 2B are made to come closest to each other.

Referring to FIG. 1 to FIG. 8, a light irradiation molding apparatus 1 and a light irradiation molding method of this Example will be explained in detail below.

A pair of rubber die units 2A and 2B are formed of transparent or translucent silicone rubber as a rubber material. A pair of the rubber die units 2A and 2B can be produced by putting a master model (hand-made original product) of a molded article 7 to be formed in liquid silicone rubber, curing the silicone rubber, and taking the master model out from the cured silicone rubber. As a pair of the rubber die units 2A and 2B are formed of rubber, a parting plane 205 (see FIG. 1 and FIG. 2), for opening the die when the molded article 7 is taken out after forming, can be easily and arbitrarily formed.

As the thermoplastic resin 6, particles of ABS resin, which is an amorphous, rubber-modified thermoplastic resin, are used. As the thermoplastic resin 6, particles having a particle size of 1 to 3000 μm can be used. In addition, the particulate thermoplastic resin 6 is a thermoplastic resin 6 in the state of a fine pellet having a bulk density of about 0.6.

As shown in FIG. 4, the light irradiation means 4 is constituted so that light X including a wavelength range of 0.78 to 2 μm is generated. The light irradiation means 4 is formed by using a halogen lamp capable of emitting light X including a wavelength range of 0.78 to 2 μm (approximately corresponding to a wavelength range of near infrared ray). As this halogen lamp, a halogen lamp having a peak of light intensity within a wavelength range of 0.78 to 2 μm (at about 0.9 μm in this Example) was used. The halogen lamp is formed using a light source 41 and a reflector 42 which collects and reflects light X emitted from the light source 41.

The light irradiation molding apparatus 1 can more selectively heat the thermoplastic resin 6 arranged in the cavity 20 than a pair of the rubber die units 2A and 2B formed of the silicone rubber by using the light irradiation means 4, whereby a molded article 7 having stable accuracy of dimension can be formed.

Figure 7:
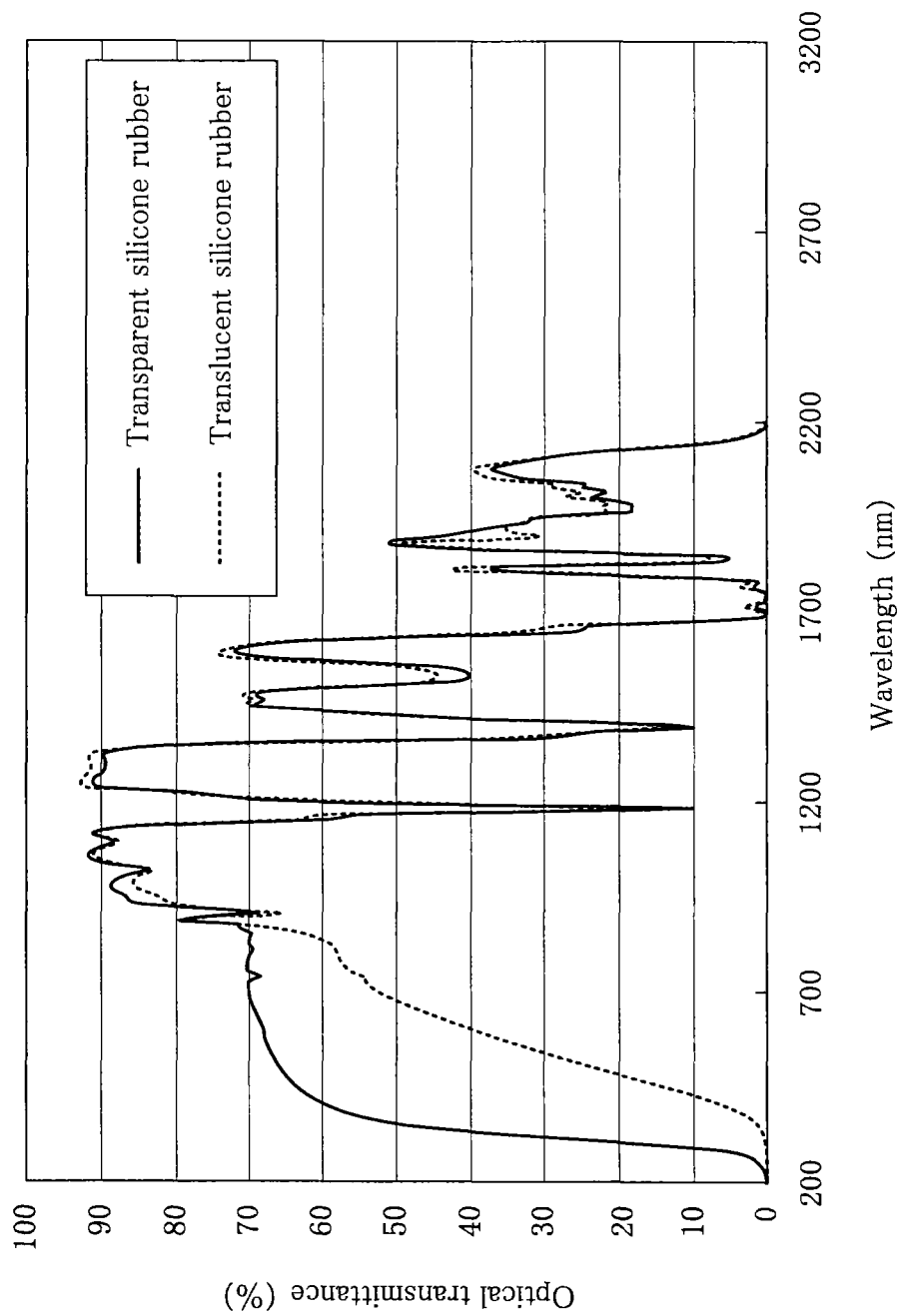
FIG. 7 A graph showing light transmittances of silicone rubbers in Example 1.

FIG. 7 is a graph showing transmittances of the light X in each silicone rubber of a transparent silicone rubber and a translucent silicone rubber, in which a horizontal axis shows a wavelength (nm) and a vertical axis shows a transmittance (%) of the light X. From the figure, it can be seen that the light X having a wavelength of 200 to 2200 (nm) can penetrate each silicone rubber. When near infrared ray having the wavelength range described above is applied to the surfaces of the rubber die units 2A and 2B formed of the silicone rubber, therefore, much of the near infrared ray can penetrate the rubber die units 2A and 2B, and can be absorbed in the thermoplastic resin 6 in the cavity 2.

As shown in FIG. 1, the light irradiation molding apparatus 1 includes a vacuum means 5 for vacuating in the cavity 20. The vacuum means 5 is a pump connecting to a pair of the rubber die units 2A and 2B, and is configured to perform vacuum suction in the cavity 20 in which the thermoplastic resin 6 is arranged to make the inside of this cavity 20 vacuum. As shown in FIG. 4 and FIG. 5, the light irradiation molding apparatus 1 is constituted so that the pressure inside the cavity 20 is made lower than the pressure outside a pair of the rubber die units 2A and 2B to generate a suction force (die clamping force) F on a pair of the rubber die units 2A and 2B, whereby a pair of the rubber die units 2A and 2B are made to come close to each other when the thermoplastic resin 6 is molten.

Figure 6:
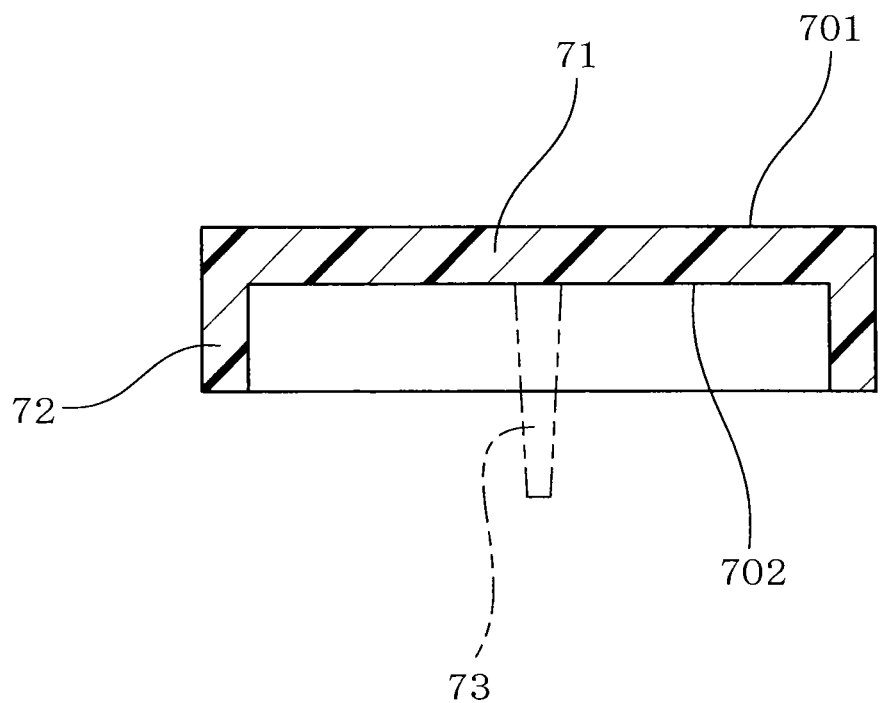
FIG. 6 An illustrative drawing showing a molded article in Example 1 as a front cross-sectional view.

As shown in FIG. 6, the molded article 7 formed by the light irradiation molding apparatus 1 has a body part 71 and a stand-up wall part 72 which is formed so as to standup almost vertically or at an angle to the body part 71. The stand-up wall part 72 in this Example is formed so that it stands up from the whole circumference of fringe area of the body part 71. In addition to this structure, the molded article 7 can be formed so that the stand-up wall part 72 stands up almost vertically or at an angle from appropriate parts on the body part 71. In addition, the molded article 7 can also be formed by cutting a formed part 73 in a suction port 27 described below.

As shown in FIG. 1 and FIG. 2, one side rubber die unit 2A, which is one unit of a pair of the rubber die units 2A and 2B, has a cavity-forming protrusion 21, which forms a reverse face 702 of the molded article 7; an annular engagement depression 22, which is formed on the whole circumference of the fringe area of the cavity-forming protrusion 21; and an annular outer circumference protrusion 23 which is formed in the state of a protrusion on the whole circumference of the fringe area of the annular engagement depression 22. The other side rubber die unit 2B, which is the other of a pair of the rubber die units 2A and 2B, has a cavity-forming depression 25, which arranges the cavity-forming protrusion 21 therein and forms a designed face 701 of the molded article 7, and an annular inner circumference protrusion 26, which protrudes from the whole circumference of the fringe area of the cavity-forming depression 25, is engaged with an inner circumferential surface 231 of the annular outer circumference protrusion 23 and is arranged in the annular engagement depression 22.

A depression to be engaged in the rubber die units 2A and 2B is formed by the annular engagement depression 22 and the annular outer circumference protrusion 23 in the one side rubber die unit 2A, and an engaging protrusion in the rubber die units 2A and 2B is formed by the annular inner circumference protrusion 26 in the other side rubber die unit 2B.

An outer circumferential surface 263 of the annular inner circumference protrusion 26 in the other side rubber die unit 2B is engaged with an inner circumferential surface 231 of the annular outer circumference protrusion 23 in an initial position P1 before a pair of the rubber die units 2A and 2B are made to come close to each other. A whole circumference of a parting plane 205, formed between a pair of the rubber die units 2A and 2B, is closed by the outer circumferential surface 263 of the annular inner circumference protrusion 26 and the inner circumferential surface 231 of the annular outer circumference protrusion 23, before and after a pair of the rubber die units 2A and 2B are made to come close to each other.

The engagement of the inner circumferential surface 231 of the annular outer circumference protrusion 23 in the one side rubber die unit 2A with the outer circumferential surface 263 of the annular inner circumference protrusion 26 in the other side rubber die unit can easily prevent leakage of the molten thermoplastic resin 6B from a gap 29 formed on the parting plane 205 for the approach of a pair of rubber die units 2A and 2B to each other.

As shown in FIG. 1 and FIG. 2, the cavity 20 is continuously formed between an apical surface 211 of the cavity-forming protrusion 21 and a bottom face 251 of the cavity-forming depression 25, between an outer circumferential surface 212 of the cavity-forming protrusion 21 and an inner circumferential surface 262 of the annular inner circumference protrusion 26, and between a bottom face 221 of the annular engagement depression 22 and an apical surface 261 of the annular inner circumference protrusion 26, in the initial position P1 before a pair of the rubber die units 2A and 2B are made to come close to each other.

As shown in FIG. 4 and FIG. 5, a pair of the rubber die units 2A and 2B are constituted so that they are made to come close to each other until the bottom face 221 of the annular engagement depression 22 in the one side rubber die unit 2A comes into contact with the apical surface 261 of the annular inner circumference protrusion 26 in the other side rubber die unit 2B, when the thermoplastic resin 6 arranged in the cavity 20 is molten. When a pair of the rubber die units 2A and 2B are made to come close to each other to form the molded article 7 in the cavity 20, the thermoplastic resin 6 is supplied from a body space 201 formed between the cavity-forming protrusion 21 and the cavity-forming depression 25, and a surplus space 203 formed between the bottom face 221 of the annular engagement depression 22 and the apical surface 261 of the annular inner circumference protrusion 26 to a stand-up wall space 202 formed between the outer circumferential surface 212 of the cavity-forming protrusion 21 and the inner circumferential surface 262 of the annular inner circumference protrusion 26. In FIG. 4 and FIG. 5, 6A shows the particulate thermoplastic resin and 6B shows the molten thermoplastic resin.

As shown in FIG. 1 and FIG. 2, in the one side rubber die unit 2A, a suction port 27, which opens in the apical surface 211 of the cavity-forming protrusion 21, and suction gates 28, which open in the bottom face 221 of the annular engagement depression 22, are formed, which pierce the rubber die unit. The suction port 27 also has a function as an input port for throwing the particulate thermoplastic resin 6A into the cavity 20. The suction port 27 further has a function as a space to which the excess molten thermoplastic resin 6B overflows from the body space 201, when the particulate thermoplastic resin 6A arranged in the body space 201 is molten.

Figure 3:
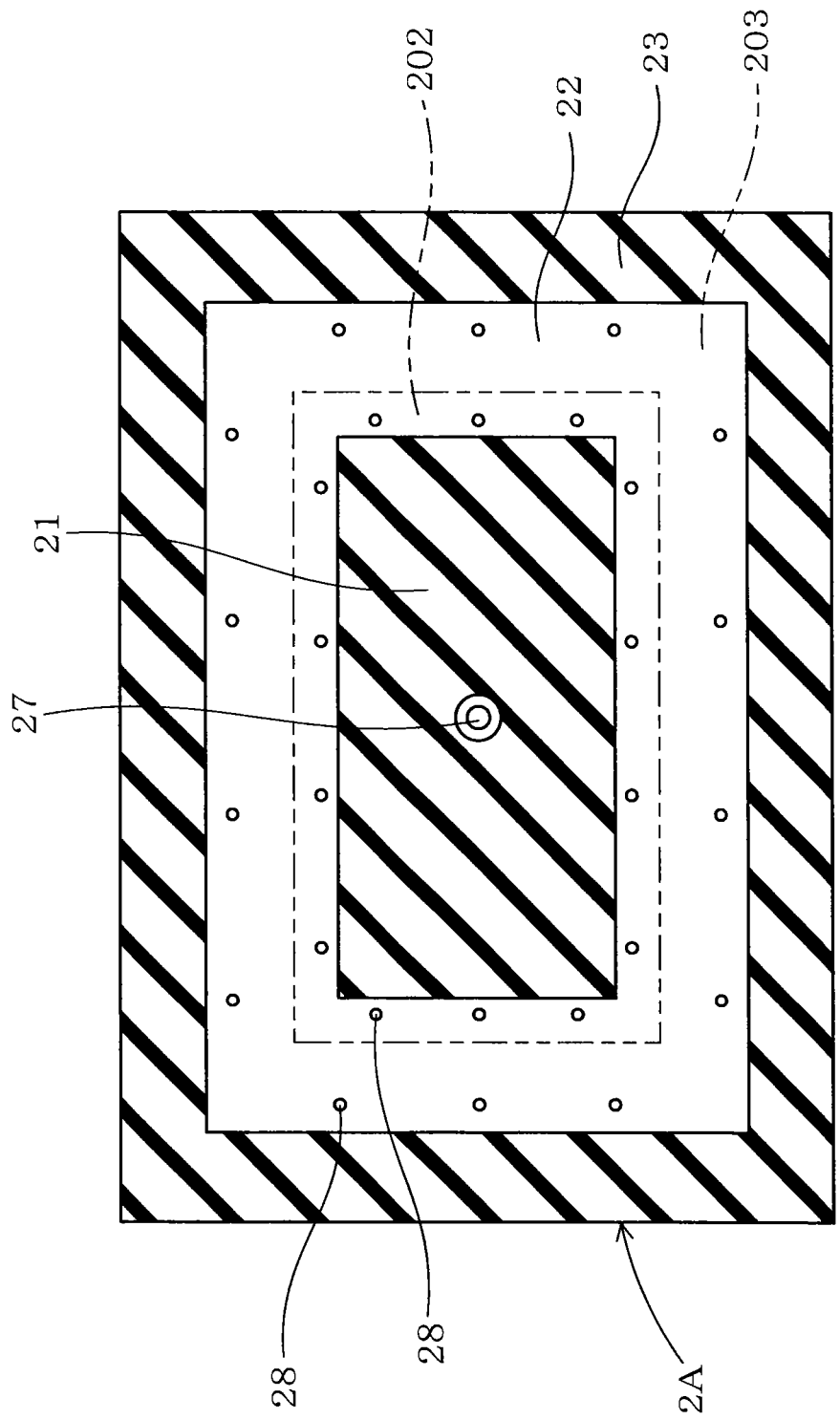
FIG. 3 An illustrative drawing showing a configuration of suction port and multiple suction gates in one side rubber die unit in Example 1, as a top cross-sectional view.

The molded article 7 formed in this Example is, as described above, an article in which the stand-up wall part 72 stands up almost vertically or in an inclination state on the whole circumference of the body part 71. As shown in FIG. 3, the suction gates 28 are formed in an open state in positions facing the bottom face 251 of the cavity-forming depression 25 and positions facing the annular inner circumference protrusion 26 in multiple portions on the bottom face 221 of the annular engagement depression 22. FIG. 3 shows a state in which the suction port 27 and the multiple suction gates 28 are formed on the one side rubber die unit 2A.

The suction gates 28 can be appropriately formed in accordance with the position at which the stand-up wall part 72 is formed.

Figure 8:
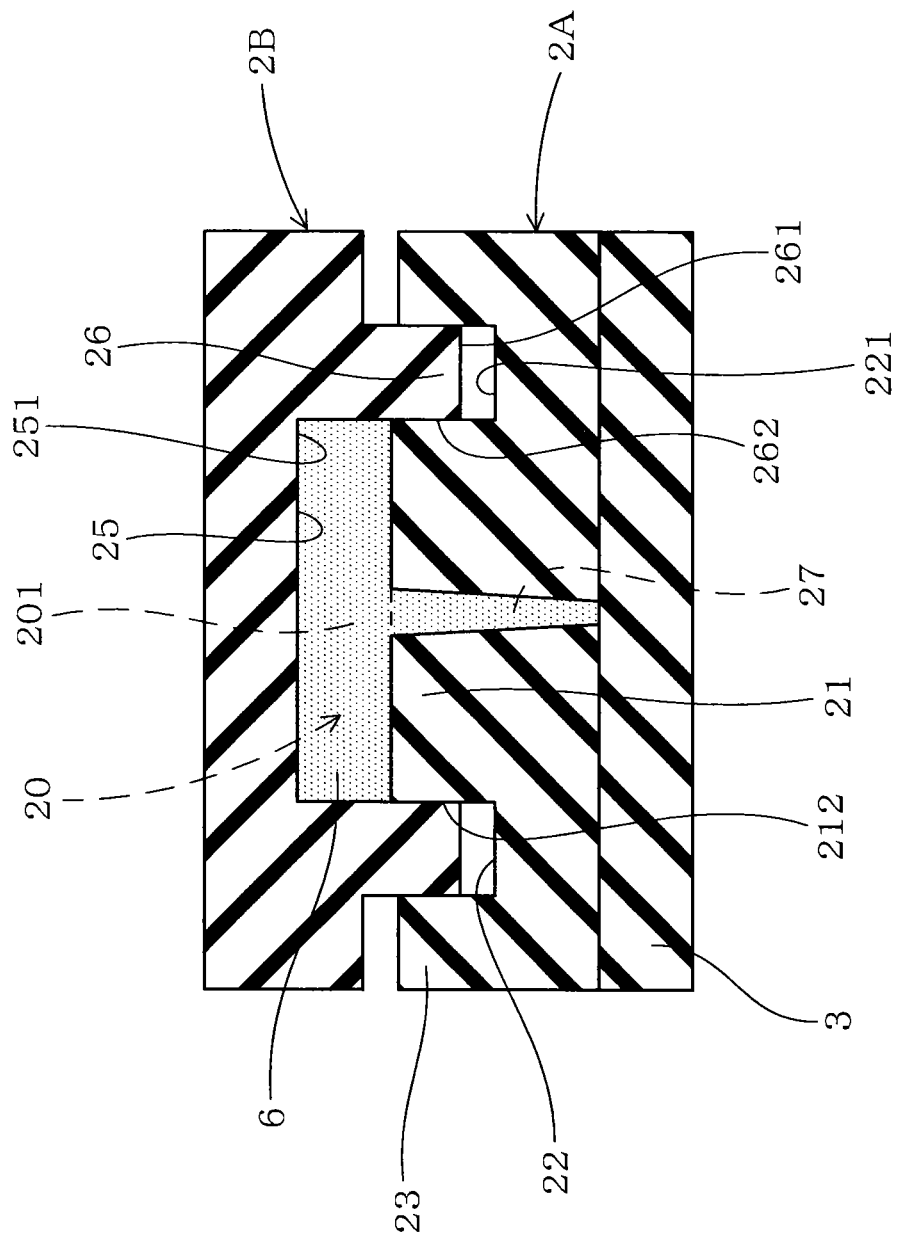
FIG. 8 An illustrative drawing showing a state in which a thermoplastic resin is arranged in a cavity between another pair of rubber die units, different from the above, in Example 1, as a lateral cross-sectional view.

For example, when only a pair of the stand-up wall parts 72 which face each other are formed, the suction gates 28 are formed in an open state only at positions facing the bottom face 251 of the cavity-forming depression 25 and positions facing the annular inner circumference protrusion 26 in parts where the stand-up wall parts 72 are formed in the bottom face 221 of the annular engagement depression 22. As shown in FIG. 8, it is possible not to form the suction gates 28 at the positions facing the bottom face 251 of the cavity-forming depression 25 and the positions facing the annular inner circumference protrusion 26 in a remaining part of the bottom face 221 of the annular engagement depression 22 in which the stand-up wall parts 72 are not formed. In this case, the outer circumferential surface 212 of the cavity-forming protrusion 21 in the one side rubber die unit 2A is brought into contact with the inner circumferential surface 262 of the annular inner circumference protrusion 26 in the other side rubber die unit 2B, in the remaining part of the bottom face 221 of the annular engagement depression 22 in which the stand-up wall parts 72 are not formed, whereby it is possible to prevent an inflow of the molten thermoplastic resin 6 into between the apical surface 261 of the annular inner circumference protrusion 26 and the bottom face 221 of the annular engagement depression 22.

As shown in FIG. 1 and FIG. 2, the suction gate 28 has smaller fluid passage cross-sectional area than that of the suction port 27. The suction gate 28 is formed to have a smaller fluid passage cross-sectional area than a particle size of the thermoplastic resin 6A, so that the particulate thermoplastic resin 6A in the cavity 20 is not sucked when the gases (air) in the cavity 20 is sucked by the vacuum means 5.

Back-up plates 3 are arranged in layers on a side of the one side rubber die unit 2A which does not face the other side rubber die unit 2B. A vacuum suction pathway 31 for vacuating by the vacuum means 5 is formed between the one side rubber die unit 2A and the back-up plates 3. The vacuum suction pathway 31 is communicated with the suction port 27 and the multiple suction gates 28.

As shown in FIG. 4 and FIG. 5, the light irradiation means 4 is located so that it faces an outside surface 206 formed parallel to the bottom face 251 of the cavity-forming depression 25 in the other side rubber die unit 2B. In the light irradiation molding apparatus 1, the particulate thermoplastic resin 6A arranged in the cavity 20 can be molten first from the side of the cavity-forming depression 25 by applying the light X emitted from the light irradiation means 4 to the outside surface 206 of the other side rubber die unit 2B. In the light irradiation molding apparatus 1, the closure of the suction gate 28 is prevented, whereby the vacuum suction can be continued by the vacuum means 5 until the molten thermoplastic resin 6B are filled in the whole of the cavity 20.

FIG. 4 and FIG. 5 show a state in which the light X is applied to a pair of the rubber die units 2A and 2B, in which the one side rubber die unit 2A having the suction port 27 formed is arranged below, from above the other side rubber die unit 2B by the light irradiation means 4. On the contrary, it is possible that a pair of the rubber die units 2A and 2B are arranged so that the one side rubber die unit 2A and the other side rubber die unit 2B are combined in a horizontal direction and the light X is applied from a horizontal direction. The light X can also be applied to a pair of the rubber die units 2A and 2B, in which the other side rubber die unit 2B is arranged below, from above the one side rubber die unit 2A by the light irradiation means 4.

Next, effects obtained from the light irradiation molding method using the light irradiation molding apparatus 1 described above will be explained.

First, in a step for arranging the resin, the particulate thermoplastic resin 6A is arranged in the cavity 20 formed between a pair of the rubber die units 2A and 2B. At this time, the thermoplastic resin 6A can be thrown from the suction port (input port) 27 formed in the one side rubber die unit 2A into the cavity 20 between a pair of the rubber die units 2A and 2B which are combined with each other. The thermoplastic resin 6A can also be arranged in the cavity-forming depression 25 in the other side rubber die unit 2B in an open state. In this case, a pair of the rubber die units 2A and 2B are combined with each other in the state in which the thermoplastic resin 6A is arranged.

In particular, when the solid thermoplastic resin 6 is used, it is possible that the thermoplastic resin 6 is arranged in the cavity-forming depression 25 or the cavity-forming protrusion 21, and then a pair of the rubber die units 2A and 2B are combined. In addition, the thermoplastic resin 6 can be used as a mixture of the particulate resin and the solid resin.

As shown in FIG. 1 and FIG. 2, in a state in which a pair of the rubber die units 2A and 2B are combined, the whole circumference of the parting plane 205 formed between a pair of the rubber die units 2A and 2B is closed by the inner circumferential surface 231 of the annular outer circumference protrusion 23 in the one side rubber die unit 2A and the outer circumferential surface 263 of the annular inner circumference protrusion 26 in the other side rubber die unit 2B.

Subsequently, in a step for molding the resin, as shown in FIG. 1, the vacuum means 5 starts vacuum suction of inside of the cavity 20 from the vacuum suction pathway 31 through the suction port 27 and the multiple suction gates 28. At this time, air in a gap, formed among the particles of the thermoplastic resin 6A in the cavity 20, is sucked, and a suction force F is applied to a pair of the rubber die units 2A and 2B and are made to come close to each other, whereby a pressure is applied to between the particles of the thermoplastic resin 6A.

Then, as shown in FIG. 4, in a state in which the vacuum suction is continued by the vacuum means 5, the light X having a wavelength range of 0.78 to 2 μm is applied to the outside surface 206 of the other side rubber die unit 2B by using the light irradiation means 4. At this time, much of the light X penetrates the other side rubber die unit 2B, and is absorbed in the thermoplastic resin 6A in the cavity 20. The thermoplastic resin 6A, which is located near the bottom face 251 of the cavity-forming depression 25 in the other side rubber die unit 2B arranged near the light irradiation means 4, is positively heated. Among the particulate thermoplastic resin 6A arranged in the cavity 20, particles, located near the bottom face 251 of the cavity-forming depression 25 of the other side rubber die unit 2B in the body space 201 of the cavity 20, are first molten.

At this time, a pressure applied to among the particles of the particulate thermoplastic resin 6A is released by the melting of the particulate thermoplastic resin 6A due to the vacuum state of gaps among the particles, and the particulate thermoplastic resin 6A in the body space 201 is molten by the suction force F applied to a pair of the rubber die units 2A and 2B to decrease the volume of the body space 201. This causes the approach of a pair of the rubber die units 2A and 2B to each other by only the decreased volume of the body space 201.

After the thermoplastic resin 6A in the cavity 20 starts to be molten, the vacuum suction in the cavity 20 is continued by the vacuum means 5.

As shown in FIG. 5, the particles, located near the bottom face 251 of the cavity-forming depression 25 in the body space 201 of the cavity 20 in the particulate thermoplastic resin 6A in the cavity 20, are first molten, and then the melting is sequentially moved to the particles located near the apical surface 211 of the cavity-forming protrusion 21. The particulate thermoplastic resin 6A arranged in the stand-up wall space 202 and the surplus space 203 in the cavity 20 is maintained in the particulate state without melting until almost entire particulate thermoplastic resin 6A arranged in the body space 201 is molten. This causes the continuation of the vacuum suction in the body space 201 in the cavity 20 from the gaps formed among the particles of the particulate thermoplastic resin 6A arranged at the suction port 27 and the multiple suction gates 28.

When the particulate thermoplastic resin 6A in the body space 201 is molten and a pair of the rubber die units 2A and 2B are made to come close to each other, then the particulate thermoplastic resin 6A arranged at the stand-up wall space 202 and the surplus space 203 is molten. At this time, the molten thermoplastic resin 6B in the surplus space 203 is supplied to the stand-up wall space 202 by the approach of a pair of the rubber die units 2A and 2B to each other when the volume of the surplus space 203 is decreased. The surplus molten thermoplastic resin 6B in the body space 201 is also supplied to the stand-up wall space 202.

Thus, a shortage of the thermoplastic resin 6 in the stand-up wall space 202 can be supplied from that in the surplus space 203 and the body space 201, when the particulate thermoplastic resin 6A in the stand-up wall space 202 is molten, and it can be avoided to thin the thickness of the stand-up wall part 72 formed in the stand-up wall space 202. A pair of the rubber die units 2A and 2B are made to come close to each other until the bottom face 221 of the annular engagement depression 22 in the one side rubber die unit 2A comes into contact with the apical surface 261 of the annular inner circumference protrusion 26 in the other side rubber die unit 2B, when the thermoplastic resin 6 arranged in the cavity 20 is molten. A molded article of the thermoplastic resin is formed in the state of a thin sheet (burr) between the bottom face 221 of the annular engagement depression 22 and the apical surface 261 of the annular inner circumference protrusion 26.

As described above, in the step for molding the resin, the vacuum suction by the vacuum means 5 is continued until the molten thermoplastic resin 6B is filled in the entire cavity 20, and the molten thermoplastic resin 6B can be spread through the whole of the cavity 20 having a reduced volume.

Next, in a step for cooling the resin, a state in which the thermoplastic resin 6B is filled in the cavity 20 formed by a pair of the rubber die units 2A and 2B is maintained. At this time, the molten thermoplastic resin 6B is cooled to be solidified, and the body part 71 is formed in the body space 201 and the stand-up wall part 7 is formed in the stand-up wall space 202, thus resulting in obtaining the molded article 7 of the thermoplastic resin 6.

After that, in a step for removing the molded article, a pair of the rubber die units 2A and 2B are released, and the molded article 7 can be taken out.

According to this Example, the thermoplastic resin 6 can be selectively heated and molten, compared to the rubber die units 2A and 2B, and the temperature increase of the rubber die units 2A and 2B is inhibited, whereby the thermoplastic resin 6 can be effectively heated. Consequently, heat deterioration of the rubber die units 2A and 2B can be effectively prevented, when the molded article 7 of the thermoplastic resin 6 is formed.

In addition, because the volume of the cavity 20 is reduced, thereby forming the molded article 7, it is not required to fill the molten thermoplastic resin 6B into the cavity 20. Apparatuses such as a resin-pouring nozzle for pouring the thermoplastic resin 6, which has been previously molten, into the cavity 20, are not required, either. Furthermore, almost all thermoplastic resin 6 arranged in the cavity 20 can be used for forming the molded article 7.

According to the light irradiation molding apparatus 1 of this Example and the light irradiation molding method using the same, therefore, an apparatus for previously melting the thermoplastic resin 6 and pouring it into the cavity 20 is not required, and the molded article 7 can be formed using a small amount of the thermoplastic resin 6 used.

Example 2

In this Example, some examples having a different structure from that of the light irradiation molding apparatus 1 of Example 1 will be shown.

Figure 9:
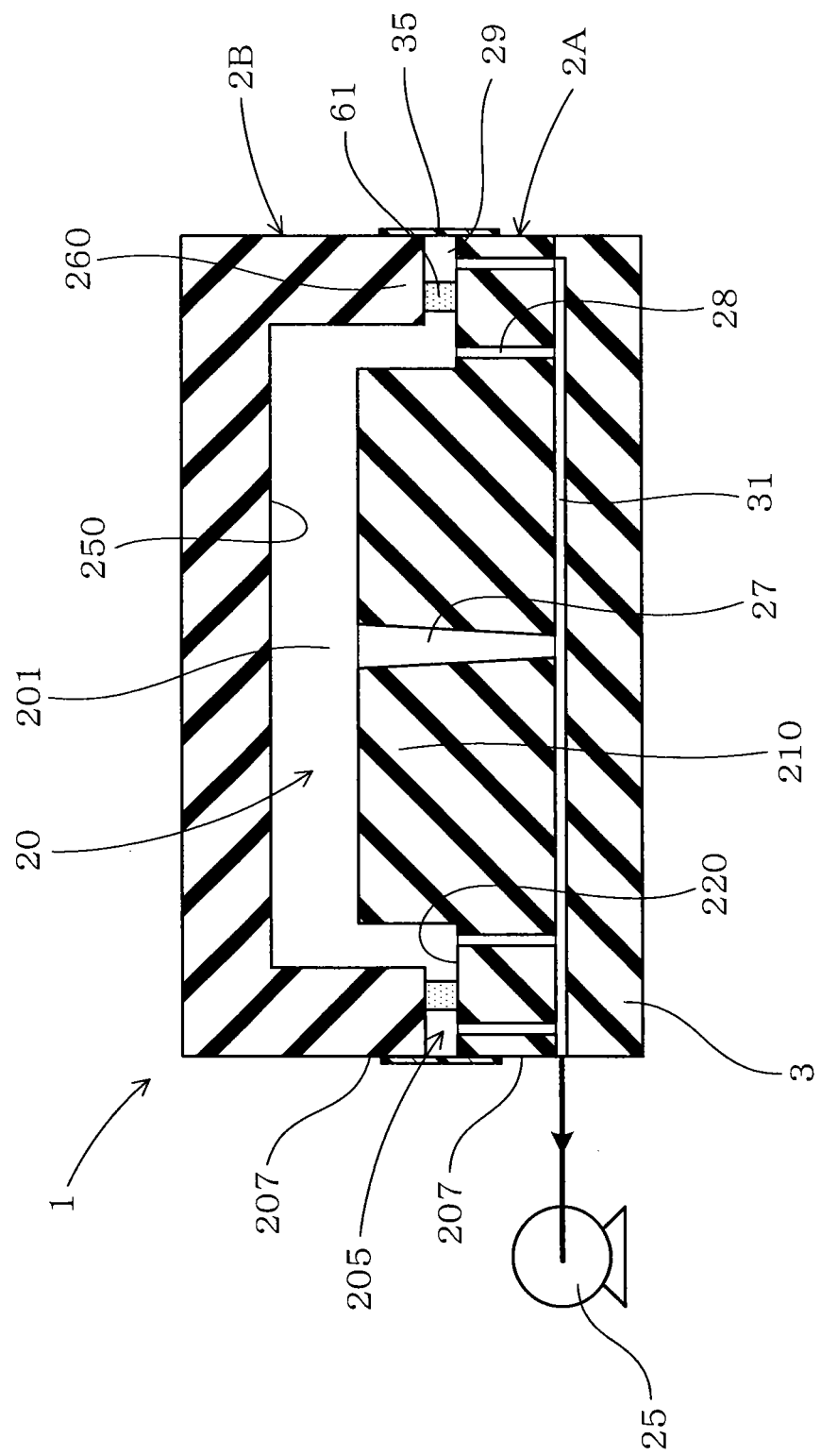
FIG. 9 An illustrative drawing showing a pair of rubber die units in an initial position in Example 2, as a front sectional-view.

A pair of rubber die units 2A and 2B can have a structure in which, as shown in FIG. 9, a whole circumference of a parting plane 205 is closed by a resin tape 35, which is pasted on the whole circumference of the parting plane 205 formed between a pair of the rubber die units 2A and 2B, in addition to a structure in which the whole circumference of the parting plane 205 between a pair of the rubber die units 2A and 2B is closed by engagement of an inner circumferential surface 231 of an annular outer circumference protrusion 23 with an outer circumferential surface 263 of an annular inner circumference protrusion 26.

Specifically, a cavity-forming protrusion 210 is formed on a one side rubber die unit 2A and, at the same time, a an annular depression 220 is formed on the whole circumference of a fringe area thereof, and a cavity-forming depression 250 is formed on the other side rubber die unit 2B and, at the same time, an annular protrusion 260 is formed on the whole circumference of a fringe area thereof.

A gap 29 formed at the parting plane 205 between the one side rubber die unit 2A and the other side rubber die unit 2B is closed by a resin tape 35, which is bridged between a side face 207 of the one side rubber die unit 2A and a side face 207 of the other side rubber die unit 2 and pasted to them. At this time, a spacer 61 of a thermoplastic resin 6 having the same composition as that of the thermoplastic resin 6 used for forming the molded article 7, is arranged between the bottom face of the annular depression 220 and the apical surface of the annular protrusion 260. A volume of the body space 201 before molding, i.e., a volume of the cavity 20 before molding, can be adjusted to an intended volume by controlling the height of this spacer 61. In this case, the resin tape 35 prevents leakage of the molten thermoplastic resin 6 in the cavity 20 into the outside through the gap 29 in the parting plane 205.

Figure 10:
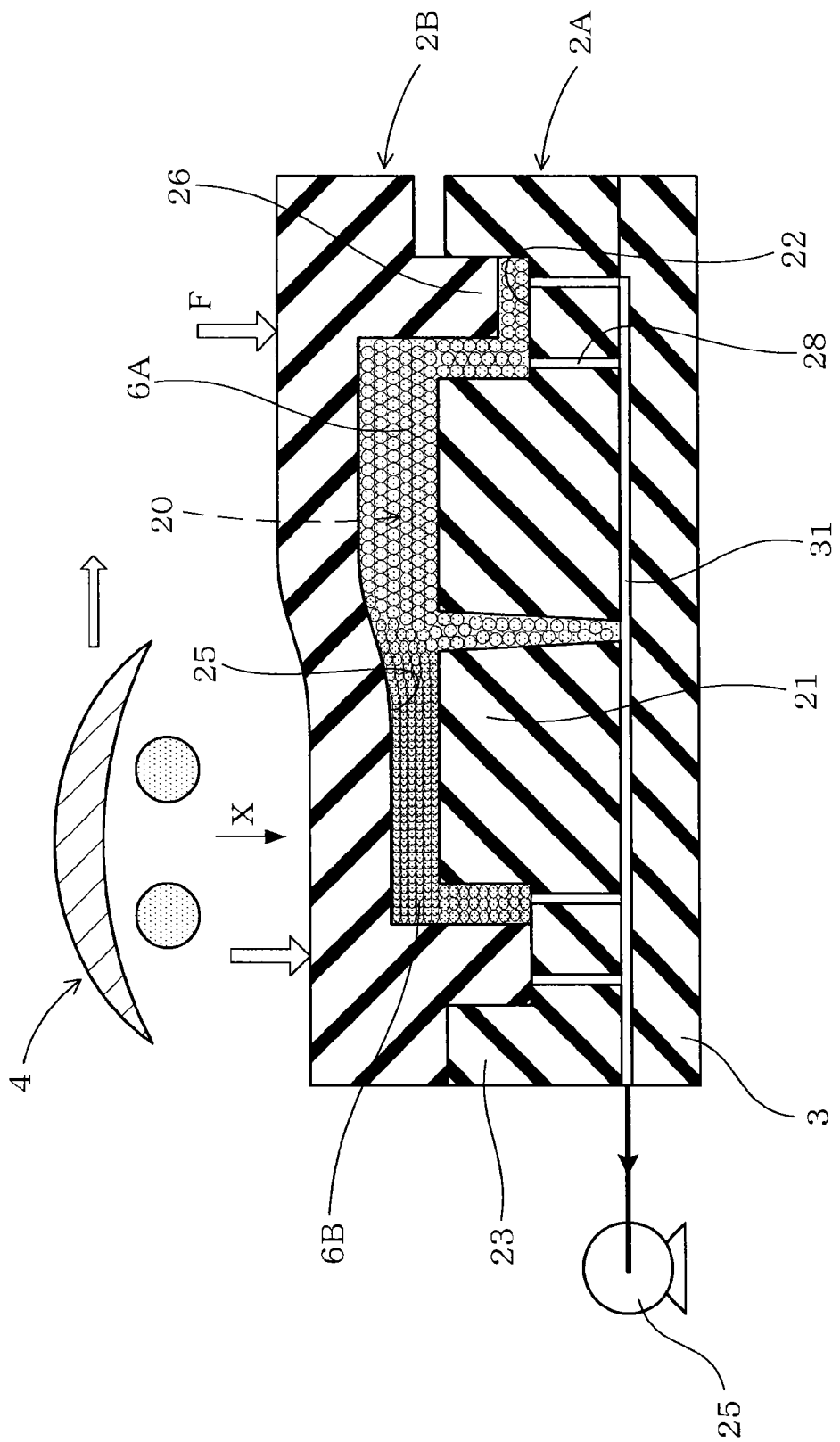
FIG. 10 An illustrative drawing showing a state in which a thermoplastic resin receives light irradiation and is molten, and a pair of rubber die units are made to come close partially and sequentially to each other in Example 2, as a front cross-sectional view.

As shown in FIG. 10, the light irradiation means 4 can be constituted so that irradiation of light X is partially performed, while it is moved sequentially from one side to the other side along an outside surface 206 formed parallel to a bottom face 251 of a cavity-forming depression 25 in the other side rubber die unit 2B, i.e., from one side to the other side in an orthogonal direction toward a facing direction of a pair of the rubber die units 2A and 2B. The thermoplastic resin 6 is sequentially heated and molten from one side to the other side in the cavity 20 formed by a pair of the rubber die units 2A and 2B by applying the light X from the light irradiation means 4, which is sequentially moved, while the inside of the cavity 20 in which the thermoplastic resin 6 is arranged is vacuated by the vacuum means 5. This enables the sequential approach of a pair of the rubber die units 2A and 2B to each other from the one side to the other side, and filling of the thermoplastic resin 6 in the entire of the cavity 20, thereby obtaining the molded article 7. In this case, the molten thermoplastic resin 6B can be stably spread through the whole of the cavity 20 by gradual melting of the particulate thermoplastic resin 6A in the cavity 20.

In this Example, the light irradiation molding apparatus 1 has the same structures as in Example 1 except for the structures described above, and the same effects as in Example 1 can be obtained.

The invention claimed is:

1. A light irradiation molding method comprising:
   providing a pair of rubber die units which are formed of a rubber material having a property of transmitting light and which form a closed cavity between respective facing sides of the pair of rubber die units which face each other and define surfaces of a part to be molded;
   providing a particulate thermoplastic resin in the closed cavity;
   applying light to the particulate thermoplastic resin, arranged in the closed cavity, through surfaces of the pair of the rubber die units;
   moving the pair of the rubber die units towards each other to reduce a volume of the closed cavity, while the thermoplastic resin arranged in the cavity is molten by applying light emitted from the light irradiation device, thereby forming a molded article of the thermoplastic resin in the closed cavity having a reduced volume; and
   providing a plurality of vacuum openings in at least one of the respective facing sides of the pair of rubber die units such that pressure inside the closed cavity can be reduced.

2. The light irradiation molding method according to claim 1, further comprising:
   providing a vacuum pathway in one of the rubber die units, the vacuum pathway being in communication with the closed cavity by said plurality of vacuum openings; and
   making a pressure inside the closed cavity lower than a pressure outside the pair of the rubber die units by the vacuum pathway and vacuum openings to generate a suction force on the pair of the rubber die units, whereby the pair of the rubber die units are made to move towards each other under said suction force when the thermoplastic resin is molten.

3. The light irradiation molding method according to claim 2,
   wherein the applying light comprises applying said light to the outside surface of the other of the pair of the rubber die units, said vacuum pathway comprising suction gates which are prevented from closing by melting and filling the particulate thermoplastic resin such that the vacuum suction by a vacuum device is continued until the thermoplastic resin is filled in the whole closed cavity.

4. The light irradiation molding method according to claim 2,
   wherein said applying light comprises applying the light moving partially and sequentially from one side of the outside surface of the other of the rubber die units to an opposite side of the other of the rubber die units, and the thermoplastic resin is sequentially filled in the cavity from one side of the closed cavity to an opposite side of the closed cavity.

5. The light irradiation molding method according to claim 1, further comprising setting said pair of rubber die units in an initial position by engaging an engaging protrusion formed in one of the rubber die units with an engaging depression to be engaged formed in the other rubber die unit before the pair of rubber die units are made to move towards each other, wherein a parting plane formed between the pair of the rubber die units is entirely closed by the engaging protrusion and the depression to be engaged.

6. The light irradiation molding method according to claim 1, further comprising setting the pair of rubber die units in an initial position by arranging a cavity-forming protrusion formed in one of the rubber die units, in a cavity-forming depression formed in the other rubber die unit before the pair of the rubber die units are made to move towards each other, wherein a parting plane formed between a pair of the rubber die units is entirely closed by a resin tape which is pasted to an entire circumference of the parting plane.

7. The light irradiation molding method according to claim 1,
   wherein one of the pair of the rubber die units comprises a cavity-forming protrusion which forms a reverse face of the molded article, an annular engagement depression which is formed on an entire circumference of a fringe area of the cavity-forming protrusion, and an annular outer circumference protrusion which is projected from an entire circumference of a fringe area of the annular engagement depression;
   the other rubber die unit comprises a cavity-forming depression which has the cavity-forming protrusion arranged therein to form a designed face of the molded article, and an annular inner circumference protrusion which is projected from an entire circumference of a fringe area of the cavity-forming depression and is engaged with an inner circumferential surface of an annular outer circumference protrusion so as to be arranged in the annular engagement depression;
   the cavity is continuously formed between an apical surface of the cavity-forming protrusion and a bottom face of the cavity-forming depression, between an outer circumferential surface of the cavity-forming protrusion and an inner circumferential surface of the annular inner circumference protrusion, and between a bottom face of the annular engagement depression and an apical surface of the annular inner circumference protrusion, in an initial position before the pair of the rubber die units are made to come close to each other; and
   said plurality of vacuum openings comprising a suction port which opens in an apical surface of the cavity-forming protrusion, and suction gates which open in a bottom face of the annular engagement depression, are formed in one of a pair of the rubber die units, wherein the method further comprising using a vacuum device to evacuate the suction port and the suction gates communicated with the vacuum suction pathway.

8. The light irradiation molding method according to claim 7, further comprising throwing the particulate thermoplastic resin into the cavity.

9. The light irradiation molding method according to claim 7,
   wherein the pair of rubber die units are made to move towards each other until a bottom face of the annular engagement depression in one of the rubber die units comes into contact with the apical surface of the annular inner circumference protrusion in the other rubber die unit, and the thermoplastic resin is supplied from a surplus space formed between the bottom face of the annular engagement depression and the apical surface of the annular inner circumference protrusion to a stand-up wall space formed between the outer circumferential surface of the cavity-forming protrusion and the inner circumferential surface of the annular inner circumference protrusion so as to form the molded article.

* * * * *